United States Patent
Klaus

(10) Patent No.: US 7,533,492 B2
(45) Date of Patent: May 19, 2009

(54) ILLUMINATED PLANT HOLDER

(75) Inventor: Dale A. Klaus, P.O. Box 259, St. Albans, MO (US) 63073

(73) Assignee: Dale A. Klaus, St. Albans, MO (US)

( * ) Notice: Subject to any disclaimer, the term of this patent is extended or adjusted under 35 U.S.C. 154(b) by 830 days.

(21) Appl. No.: 11/199,384

(22) Filed: Aug. 8, 2005

(65) Prior Publication Data

US 2006/0026898 A1     Feb. 9, 2006

Related U.S. Application Data

(60) Provisional application No. 60/599,505, filed on Aug. 6, 2004.

(51) Int. Cl.
   *A01G 9/02*     (2006.01)
(52) U.S. Cl. ....................................... 47/66.6
(58) Field of Classification Search .................. 47/66.5, 47/65.5, 67, 69, 79–83, 85–87, 41.01
   See application file for complete search history.

(56) References Cited

U.S. PATENT DOCUMENTS

| | | | | |
|---|---|---|---|---|
| 1,389,132 A | * | 8/1921 | Galavan | 362/101 |
| 2,604,579 A | * | 7/1952 | Deneboudes | 362/101 |
| 3,552,058 A | * | 1/1971 | Fici | 47/79 |
| 4,349,864 A | * | 9/1982 | Smith | 362/122 |
| 4,594,646 A | * | 6/1986 | Von Kohorn et al. | 362/101 |
| 4,924,361 A | * | 5/1990 | Von Kohorn | 362/96 |
| 6,385,899 B1 | * | 5/2002 | Treganza | 47/39 |
| 6,923,549 B2 | * | 8/2005 | Hoy | 362/101 |

* cited by examiner

*Primary Examiner*—Son T. Nguyen
(74) *Attorney, Agent, or Firm*—Harness, Dickey & Pierce, P.L.C.

(57) ABSTRACT

A planter comprising an outer shell having a bottom wall and a side wall, at least of portion of which is translucent for enabling a light source within the side wall to provide an illuminated appearance to the planter. The planter includes a space on the bottom of the outer shell of the planter for mounting a light fixture, wherein a lighting element is projected from the light fixture into a space inside the side wall to illuminate the translucent side wall. The planter also includes a strut extending between the bottom of an inner shell for holding a plant and the bottom of an outer shell, to provide a support and drain to the inner shell for holding the plant.

20 Claims, 2 Drawing Sheets

ILLUMINATED PLANT HOLDER

CROSS-REFERENCE TO RELATED APPLICATIONS

This application claims the benefit of U.S. Provisional Application No. 60/599,505, filed on Aug. 6, 2004. The disclosure of the above application is incorporated herein by reference.

FIELD OF THE INVENTION

This invention relates to a holder for a potted plant and, in particular, to an illuminated planter for holding a plant.

BACKGROUND OF THE INVENTION

Many types of plant holders and planters have been known to include accent lighting to illuminate the plant with a light source, or to provide decorative lighting. Various prior patents have disclosed planters with a light source projecting upward to illuminate the plant, or projecting outward through patterns in the side wall of the planter. While most of these types of illuminated planters provide lighting to give a decorative effect to the plant and surrounding floor area, most of these planters do not provide for illumination of a planter for enhancing the aesthetic appearance of the planter, while maintaining a fully functioning planter.

SUMMARY OF THE INVENTION

The present invention relates to an illuminated planter for holding a plant. One embodiment of the planter comprises an outer shell having a bottom, and a sidewall at least a portion of which is translucent. An inner shell is disposed inside the outer shell. The inner shell has a sidewall and a bottom, and defines a plant-holding volume, and the bottom of the inner shell is spaced from the bottom of the outer shell to define a chamber therebetween. A strut extends between the bottom of the inner shell and the bottom of the outer shell. There is a light source in the chamber for illuminating the translucent portions of the sidewall of the outer shell.

The strut preferably comprises a hollow tubular member with a passage communicating with the interior of the inner shell and the exterior of the outer shell, to drain the inner shell. The bottom of the outer shell preferably has a raised central portion, and the strut extends between the raised the bottom of the inner shell and the raised central portion of the bottom of the outer shell. The light source preferably comprises a light fixture located below the raised central portion of the bottom of the outer shell, with a lighting element projecting from the light fixture into the chamber.

Thus various embodiments of planters in accordance with the principles of the present invention feature an illuminated sidewall, a plant holding volume that is supported above the illuminated portion, but which is well drained. The light fixture can be located outside of the planter, and the illumination source can positioned in a relatively high location inside the planter. The planter has substantial decorative and ornamental value, and is of simple, relatively inexpensive, yet sturdy construction.

BRIEF DESCRIPTION OF THE DRAWINGS

Corresponding reference numerals indicate corresponding parts throughout the several views of the drawings.

DETAILED DESCRIPTION OF THE INVENTION

Figure 1:
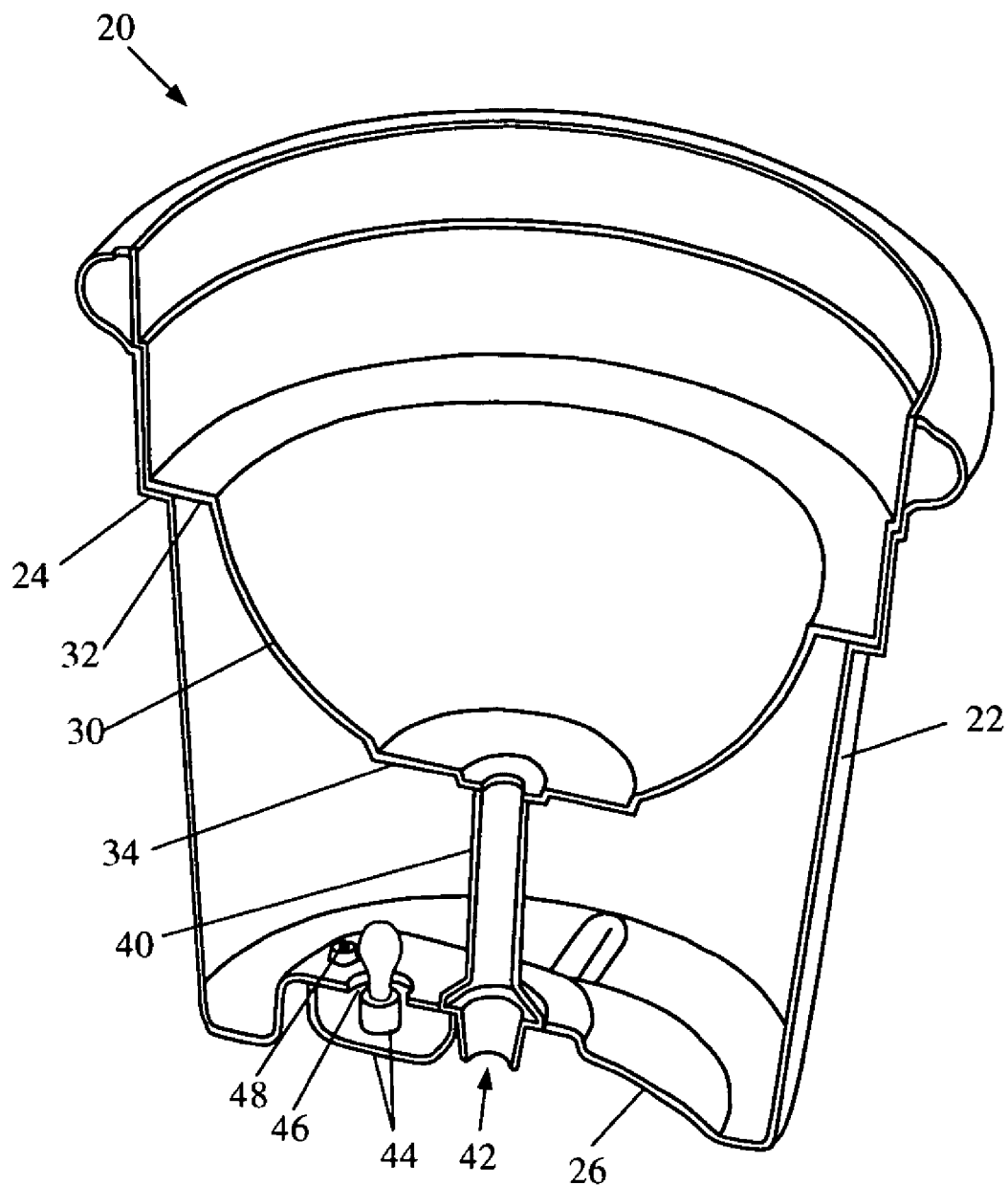
FIG. 1 is a cross-sectional perspective view of one embodiment of a planter in accordance with the principles of the present invention.
Figure 2:
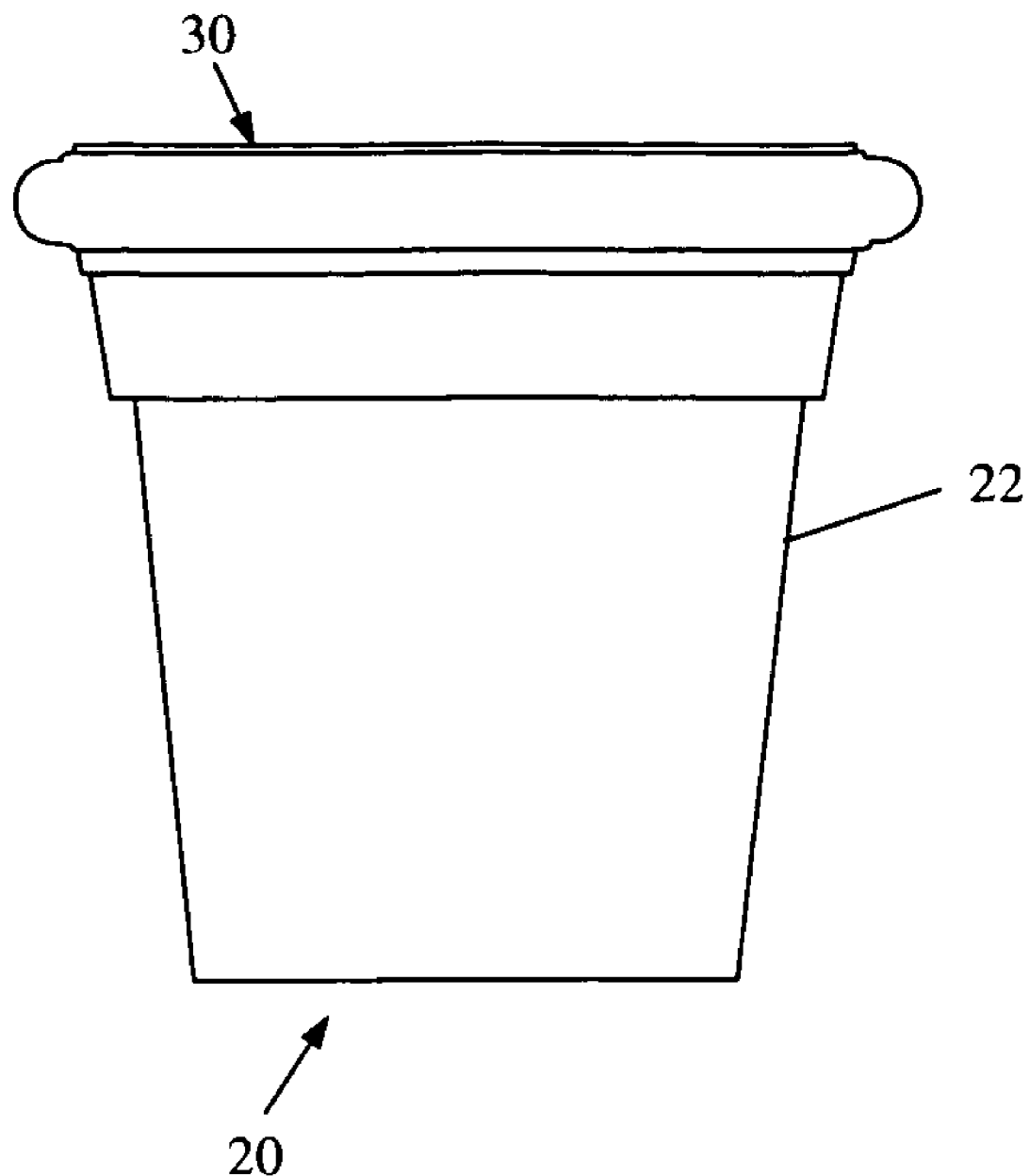
FIG. 2 is a side view of one embodiment of a planter in accordance with the principles of the present invention.

One embodiment of a planter having an illuminated sidewall in accordance with the principles of the present invention is indicated generally as 20 in FIG. 1. The planter 20 comprises an outer shell 22 having a bottom 26, a shoulder 24 and a side wall, a portion of which is translucent. The planter 20 further comprises an inner shell 30 disposed inside the outer shell 22, having a side wall, a bottom 34 and a shoulder 32 that engages and is supported by the corresponding shoulder 24 on the outer shell 22. The bottom 34 of the inner shell 30 is elevated above the bottom 26 of the outer shell 22 so as to provide a chamber beneath the inner shell that is defined by the space between the inner shell 30 and the outer shell 22. A lighting fixture 44 is located below the bottom 26 of the outer shell 22, and a lighting element (not shown) projects from the lighting fixture 44 through an opening 46 in the bottom 26 of the outer shell 22 into the chamber for illuminating the translucent portions of the side wall of the outer shell.

In the preferred embodiment, the outer shell 22 is preferably made of a translucent plastic, but may alternatively be made of fiberglass, glass, ceramic or other translucent material suitable for use in a planter. The bottom of the outer shell 22 has a raised central portion 26 surrounded by an annular well, forming a concavity on the exterior of the bottom of the outer shell 22. A lighting fixture may be suitably located in the raised central portion 26, to provide a simple, economical design for incorporating a lighting source in the planter 20. The bottom of the outer shell 22 further comprises at least one elongate recess in the bottom of the outer shell that forms a passage to the concavity or raised central portion 26. This passage is of sufficient size for enabling an electrical cord from a light fixture 44 to be placed through the passage 26 to a wall plug (not shown). It should be noted that the lighting fixture may also be adapted to receive a battery power source for providing power to the lighting element. The lighting fixture 44 is preferably adapted to receive a replaceable lighting element such as a florescent or incandescent light source. Such a lighting source may project from the lighting fixture through an opening 46 in the bottom of the outer shell 22. The lighting fixture 44 may be affixed to the outer shell 22 by a screw, which may be conveniently assembled into the bottom 26 at hole 48. Thus, the planter of the present invention provides an economical means for incorporating a light source for illuminating a translucent portion of the planter, to provide an aesthetically pleasing ornamental appearance to the planter.

In the preferred embodiment, the inner shell 30 is preferably made of plastic, but may alternatively be made of fiberglass, glass, ceramic or other material suitable for use in a planter. The inner shell 30 comprises a shoulder 32 that engages the shoulder 24 on the outer shell 22, which locates and supports the inner shell 30 with respect to the outer shell 22. The inner shell further comprises a side wall and a bottom 34, which define a volume for holding a plant. The space or chamber between the inner shell 30 and the outer shell 22 may be illuminated by a light source, such that the light source illuminates the portion of the translucent side wall of the outer shell 22 below the shoulder 24. Within the chamber between the inner shell 30 and the outer shell 22 is a strut 40 that extends between the bottom 34 of the inner shell 30 and the raised central portion of the bottom 26 of the outer shell to act as a support for the inner shell 30. The strut 40 comprises a hollow tubular member with a passage communicating with the interior of the inner shell and the exterior of the outer shell, to also provide a drain 42 for the plant holding volume of the inner shell 30. The planter may also be adapted to releasably receive a drain pan below the drain 42. Thus, the planter of the present invention provides a means for providing both a support and a drain to the inner volume that holds the plant, to provide an improved planter design.

The advantages of the above described embodiment and improvements should be readily apparent to one skilled in the art, as to providing an illuminated planter. Additional design considerations such as a detachable drain pan, may be incorporated without departing from the spirit and scope of the invention. Accordingly, it is not intended that the invention be limited by the particular embodiment or form described above, but by the appended claims.

What is claimed is:

1. An illuminated planter comprising:
    an outer shell comprising a bottom, and a sidewall at least a portion of which is translucent;
    an inner shell disposed inside the outer shell, the inner shell having a sidewall and a bottom, defining a plant-holding volume;
    the bottom of the inner shell spaced from the bottom of the outer shell to define a chamber therebetween;
    a strut extending between the bottom of the inner shell and the bottom of the outer shell, the strut comprising a hollow tubular member having a passage therein that extends between an opening in the bottom of the inner shell and an opening in the bottom of the outer shell, which passage communicates with the interior of the inner shell to permit drainage from the plant-holding volume of the inner shell to the exterior of the outer shell; and
    a light source in the chamber for illuminating the translucent portions of the sidewall of the outer shell.

2. The illuminated planter according to claim 1 wherein the bottom of the outer shell has a raised central portion, and wherein the strut extends between the bottom of the inner shell and the raised central portion of the bottom of the outer shell.

3. The illuminated planter according to claim 1 wherein the light source comprises a light fixture located below the raised central portion of the bottom of the outer shell, and a lighting element projecting from the light fixture into the chamber.

4. The illuminated planter according to claim 1 wherein the bottom of the outer shell has a raised central portion, surrounded by an annular well, forming a concavity on the exterior of the bottom of the outer shell, and at least one elongate recess in the bottom of the container forming a passage to the concavity.

5. The illuminated planter according to claim 1 further comprising a shoulder in the sidewall of the outer shell, the shoulder engaging a corresponding shoulder on the sidewall of the inner shell, the sidewalls of the inner and outer shells below the shoulders being spaced apart so that the light from the light source illuminates the portion of the sidewall of the outer shell below the shoulder.

6. The illuminated planter according to claim 1 wherein the sidewall of the outer shell comprises an upper and a lower section, separated by a shoulder, and wherein the sidewall of the inner shell has a corresponding shoulder that engages the shoulder on the outer shell, and wherein the sidewall of the inner shell below the shoulder is spaced from the lower section of the sidewall of the outer shell so that light from the light source illuminates the entire lower section of the sidewall of the outer shell.

7. The illuminated planter according to claim 6, wherein the light source in the chamber includes a replaceable lighting element that projects through an opening in the bottom of the outer shell, and wherein the inner shell may be lifted to remove the inner shell from a position of engagement with the shoulder of the outer shell, to allow access for replacement of the replaceable lighting element.

8. An illuminated planter comprising:
    an outer shell comprising a bottom, and a sidewall at least a portion of which is translucent;
    an inner shell disposed inside the outer shell, the inner shell having a sidewall and a bottom, defining a plant-holding volume;
    the bottom of the inner shell spaced from the bottom of the outer shell to define a chamber therebetween;
    a hollow strut extending between the bottom of the inner shell and the bottom of the outer shell, the hollow strut having a passage communicating with the plant-holding volume in the interior of the inner shell and the exterior of the outer shell to permit drainage from the plant-holding volume of the inner shell through the passage to the exterior of the outer shell; and
    a light source in the chamber for illuminating the translucent portions of the sidewall of the outer shell.

9. The illuminated planter according to claim 8 wherein the bottom of the outer shell has a raised central portion, and wherein the strut extends between the bottom of the inner shell and the raised central portion of the bottom of the outer shell.

10. The illuminated planter according to claim 9 wherein the light source comprises a light fixture located below the raised central portion of the bottom of the outer shell, and a lighting element projecting from the light fixture into the chamber.

11. The illuminated planter according to claim 8 wherein the bottom of the outer shell has a raised central portion, surrounded by an annular well, forming a concavity on the exterior of the bottom of the outer shell, and at least one elongate recess in the bottom of the container forming a passage to the concavity.

12. The illuminated planter according to claim 8 further comprising at least one shoulder in the sidewall of the outer shell, the at least one shoulder engaging at least one corresponding shoulder on the inner shell.

13. The illuminated planter according to claim 8 further comprising a shoulder in the sidewall of the outer shell, the shoulder engaging a corresponding shoulder on the sidewall of the inner shell, the sidewalls of the inner and outer shells below the shoulders being spaced apart so that the light from the light source illuminates the portion of the sidewall of the outer shell below the shoulder.

14. The illuminated planter according to claim 8 wherein the sidewall of the outer shell comprises an upper and a lower section, separated by a shoulder, and wherein the sidewall of the inner shell has a corresponding shoulder that engages the shoulder on the outer shell, and wherein the sidewall of the inner shell below the shoulder is spaced from the lower section of the sidewall of the outer shell so that light from the light source illuminates the entire lower section of the sidewall of the outer shell.

15. An illuminated planter comprising:
    an outer shell comprising a bottom, at least one shoulder in the sidewall of the outer shell, and a sidewall at least a portion of which is translucent, wherein the bottom of the outer shell has a raised central portion, an inner shell disposed inside the outer shell, the inner shell having a sidewall, at least one shoulder engaging the at least one shoulder of the outer shell, and a bottom, defining a plant-holding volume;

the bottom of the inner shell spaced from the bottom of the outer shell to define a chamber therebetween;

a hollow strut extending between to the bottom of the inner shell and the raised central section of the bottom of the outer shell, wherein the strut comprises a hollow tubular member with a passage therein that extends between an opening in the bottom of the inner shell and an opening in the bottom of the outer shell, the passage communicating with the interior of the inner shell and the exterior of the outer shell to permit drainage from the plant-holding volume of the inner shell through the passage to the exterior of the outer shell; and a light source in the chamber for illuminating the translucent portions of the sidewall of the outer shell.

16. The illuminated planter according to claim 15 wherein the bottom of the outer shell has a raised central portion, surrounded by an annular well, forming a concavity on the exterior of the bottom of the outer shell, and at least one elongate recess in the bottom of the container forming a passage to the concavity.

17. The illuminated planter according to claim 15 wherein the light source comprises a light fixture located below the raised central portion of the bottom of the outer shell, and a lighting element projecting from the light fixture into the chamber.

18. The illuminated planter according to claim 17 further comprising a shoulder in the sidewall of the outer shell, the shoulder engaging a corresponding shoulder on the sidewall of the inner shell, the sidewalls of the inner and outer shells below the shoulders being spaced apart so that the light from the light source illuminates the portion of the sidewall of the outer shell below the shoulder.

19. The illuminated planter according to claim 17 wherein the sidewall of the outer shell comprises an upper and a lower section, separated by a shoulder, and wherein the sidewall of the inner shell has a corresponding shoulder that engages the shoulder on the outer shell, and wherein the sidewall of the inner shell below the shoulder is spaced from the lower section of the sidewall of the outer shell so that light from the light source illuminates the entire lower section of the sidewall of the outer shell.

20. The planter according to claim 19 wherein the entire outer shell is translucent.

* * * * *